Dec. 2, 1941.   F. E. O'NEILL   2,265,082
MEANS OF CUTTING PIPE
Filed April 8, 1939
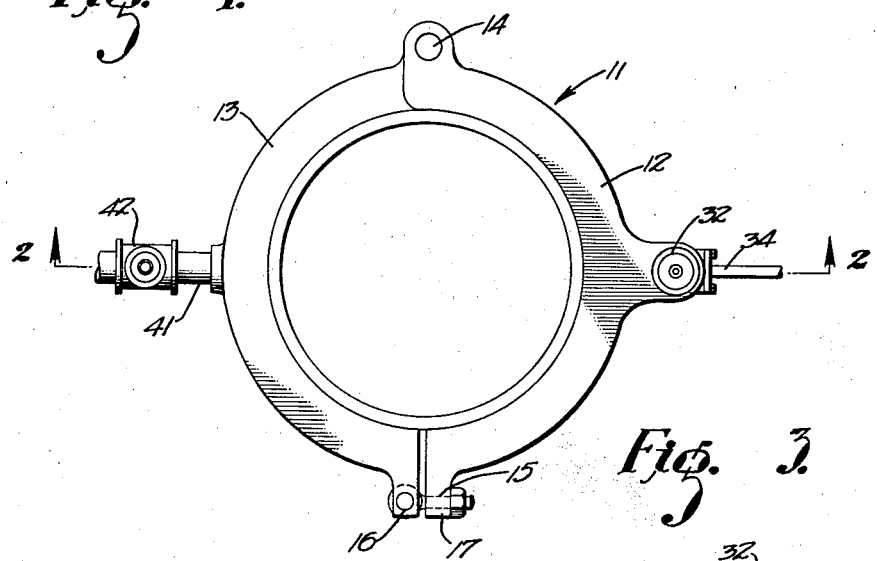
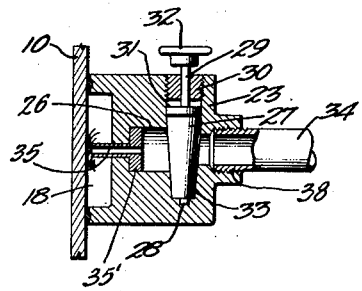
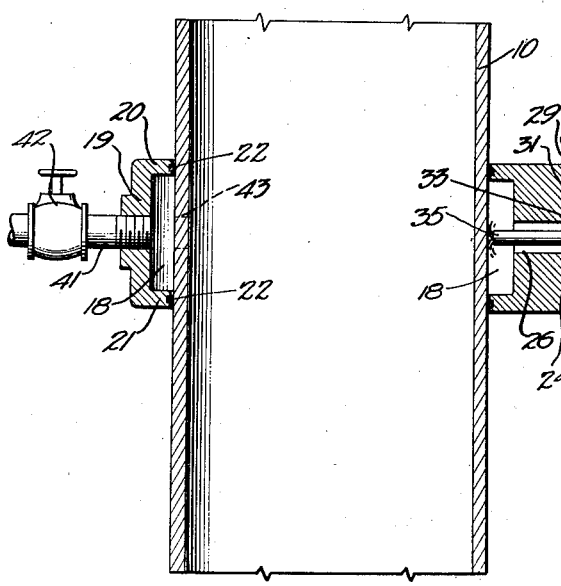
INVENTOR
FRANK E. O'NEILL
BY
*James M. Abbitt*
ATTORNEY Patented Dec. 2, 1941

2,265,082

UNITED STATES PATENT OFFICE 2,265,082

MEANS OF CUTTING PIPE

Frank E. O'Neill, Glendale, Calif., assignor to E. L. O'Neill, Glendale, Calif.

Application April 8, 1939, Serial No. 266,766

2 Claims. (Cl. 51—8)

This invention relates to oil field equipment and particularly pertains to a method and means of cutting pipe.

At the present time it often occurs that a well casing or tubing, or a pipe line, must be perforated or severed without interrupting service through it, and while the fluid flowing through it is under extreme pressure or may be highly explosive. In such instances the pipe must be perforated and tapped by mechanical cutters which are difficult to handle, and which of necessity allow a release of the fluid within the conduit when the wall of the conduit has been perforated. In the event that the pipe is cut with a torch there is possibility of an explosion immediately after the perforation has been made. It is the principal object of the present invention, therefore, to provide simple and effective means whereby the wall of a conduit may be perforated without danger of objectionably releasing the pressure of such fluid as may be present in a conduit or to permit the escape of explosive fluid in a manner to make an explosion likely. The invention particularly contemplates that the perforation will be cut by the use of an abrasive fluid, such for example as the drilling fluid available in an oil well, or other fluids carrying suspended solids of an abrasive character.

The invention is illustrated by way of example in the accompanying drawing, in which:

Figure 1 is a view in plan showing the present invention as applied to a cylindrical casing or tubing.

Fig. 2 is a view in transverse section through the structure as seen on the line 2—2 of Fig. 1.

Fig. 3 is a fragmentary view in section showing an alternate form of the valve element.

Referring more particularly to the drawing, 10 indicates a tubular element having a cylindrical wall which is to be perforated. It is understood that within this element a fluid may be present which is under excessive pressure or which may be explosive in character. When an emergency arises requiring that the member 10 shall be perforated or cut, perforating collar 11 is provided. This collar includes semi-circular segments 12 and 13. These may be bolted together at both of their ends but are here shown as hinged together at 14 and secured together by a bolt 15 disposed diametrically opposite from the hinge 14. The free ends of the segments 12 and 13 carry lugs 16 and 17 which are engaged by the bolt 15 and clamp the collar structure in an embracing position around the pipe 10. The sectional formation of the collar structure may be varied as required but is here shown as being channel shaped and thus providing a fluid passageway 18 directly around the pipe 10. The channel section includes the circumferential portion 19 and a pair of parallel flanges 20 and 21. These flanges are here shown as having grooves in their faces to receive suitable packing 22 and to make a fluid-tight seal between the collar 11 and the pipe 10.

In the collar segment 12 a valve housing 23 is formed. This is here shown as being formed with a tapered seat 24 intersected by longitudinally aligned passageways 25 and 26. Mounted in the seated portion 24 is a frusto-conical valve 27 having a trunnion 28 at one end. The trunnion 28 preferably fits within a blind bearing seat within the housing. At the opposite end of the valve element 27 is a stem 29 extending through a bearing collar 30. This collar is preferably threaded into position and holds a packing ring 31 in place to prevent leakage. An operating element, such as the knob 32, is carried upon stem 29. Extending through the valve element 27 is an opening 33 which aligns with the passageways 25 and 26 to form a continuous passageway through the valve housing 23 and the valve element 27, for a purpose to be hereinafter described.

Perforations in the present instance are made by the action of an abrasive fluid delivered through a conduit 34 from some source of fluid under pressure. Connected to the end of the conduit is a nozzle 35, here shown as formed with an enlarged collar 36 which seats within a seat 37 in the valve housing 23. It is intended that the nozzle 35 will be axially aligned with the passageways 25 and 26 in the housing and the passageway 33 through the valve element 27 when the valve element is rotated to its open position, as shown in Fig. 2 of the drawing. The length of the nozzle 35 is such as to permit it to extend through the opening 26 and to terminate adjacent to the surface of the wall of the pipe 10. The nozzle structure is held in position by a bolting plate 39, which engages the collar 36 and is secured by bolts 40. The conduit 34 is secured suitably to the plate 39 and thus held in position with relation to the nozzle 35.

In order to relieve the fluid from the chamber 18 within the collar 11 a pipe connection 41 is provided and may be fitted with a valve 42. It will also be evident that this pipe connection may be used as a draw-off pipe when a perforation has been made and after the perforating nozzle has been drawn and the valve 27 closed.

In operation of the present invention the structure is made as here shown to embrace a suitable sized pipe. It is also to be pointed out that while this invention has been described as making a perforation that the structure might be rotated around a tubular casing element so that the jet from the nozzle 35 would eventually sever the entire casing. In any event the collar 11 is clamped in position by the bolt 15, after which the valve 27 is opened so that the perforating nozzle 35 may extend therethrough and be clamped by the plate 39. Perforating operations are then initiated by delivering an abrasive fluid under pressure through the pipe 34 so that this fluid will be projected in a jet from the nozzle 35 and will impinge against the surface of the pipe 10. The spent fluid will then accumulate within the chamber 18 and may flow outwardly through the pipe 41. When a perforation has been completed, as indicated at 43, the fluid from within the pipe 10 will be free to flow outwardly but will be confined within the collar 11 and may be drawn off under controlled flow through the valve 42. It will thus be seen that the pipe 10 will be sealed at all times and that this arrangement will insure that the pressure will not be appreciably relieved from the pipe or that explosive fluids will be released to the atmosphere. When it is desired to remove the nozzle 35 the plate 39 may be unbolted so that the nozzle may be quickly withdrawn and the valve 27 closed. Under such a condition a relatively small loss of fluid would take place. It is also to be understood that since the nozzles 35 are relatively cheap they might be permanently installed within the collar 11 and at a point between the valve element 27 and the pipe. This would make it possible to provide an emergency collar of the type here shown and after perforating the pipe to leave the collar in position with the valves 27 closed and the pressure conduits disconnected.

In the form of the invention shown in Fig. 3 of the drawing the pipe 34 carrying the pressure fluid is shown as being threaded into a boss on the valve housing, and the nozzle 35 is indicated as being mounted within the passageway 26 and as being formed with a piston disc 35' which will be acted against by fluid pressure to force the nozzle 35 to its seated position and will thus temporarily hold the nozzle 35 in the bore 26. When the structure is disconnected the nozzle 35 may be removed or interchanged. It will be evident that in this form of the invention the valve will operate without any interference from the nozzle 35 as would be the case in Fig. 2 of the drawing.

It will thus be seen that by the method and means here shown it is possible to perform the operation known in the oil industry as "hot tapping," whereby a fluid line may be tapped without interruption of the flow of fluid therethrough regardless of its pressure or its character, and whereby the tapping operation may be produced by a simple, effective and safe cutting medium.

It should also be pointed out that by this method of cutting the operation is sparkless so that there is no danger of igniting explosive or inflammable material within the pipe, that the cutting operation produces a clean smooth hole without having exerted any pressure against the pipe to distort or strain it, and that furthermore, by this mode of cutting no chips are formed since the material is abraded microscopically.

While I have shown the preferred form of my invention as now known to me, it will be understood that various changes may be made in combination, construction, and arrangement of parts by those skilled in the art, without departing from the spirit of my invention as claimed.

Having thus described my invention, what I claim and desire to secure by Letters Patent is:

1. A device for perforating a pipe within which fluid is confined, which comprises an articulate member adapted to embrace the pipe and form a fluid-tight seal therewith, a fluid chamber formed within the articulate member and between the pipe and said articulate member, a passageway leading from the articulate member, a conduit conducting an abrasive fluid under pressure to said passageway and to the chamber within the articulate member, a nozzle adapted to create a jet within the articulate member and which jet impinges against the wall of the pipe embraced, and a valve adapted to close the passageway.

2. A device for perforating and cutting a pipe within which fluid is confined, which comprises a member embracing the pipe and combining therewith to form a perforating chamber, said member being capable of movement around and over the surface of the pipe while being clamped thereon and forming a fluid seal therewith, a nozzle extending through the wall of said embracing member and through which abrasive fluid under pressure is forced to erode an opening through the pipe as the embracing member is moved with relation thereto, and valve control means for draining fluid from the chamber within the embracing member.

FRANK E. O'NEILL.